(12) United States Patent
Kim

(10) Patent No.: US 9,064,059 B2
(45) Date of Patent: Jun. 23, 2015

(54) CONTROLLER FOR SOLID STATE DISK, WHICH CONTROLS SIMULTANEOUS SWITCHING OF PADS

(75) Inventor: Young-Goan Kim, Seongnam-si (KR)

(73) Assignee: OCZ Storage Solutions Inc., San Jose, CA (US)

( * ) Notice: Subject to any disclaimer, the term of this patent is extended or adjusted under 35 U.S.C. 154(b) by 264 days.

(21) Appl. No.: 13/146,427

(22) PCT Filed: Nov. 3, 2009

(86) PCT No.: PCT/KR2009/006420
§ 371 (c)(1),
(2), (4) Date: Jul. 27, 2011

(87) PCT Pub. No.: WO2010/087568
PCT Pub. Date: Aug. 5, 2010

(65) Prior Publication Data
US 2011/0289262 A1    Nov. 24, 2011

(30) Foreign Application Priority Data

Jan. 29, 2009   (KR) ................. 10-2009-0006854

(51) Int. Cl.
*G06F 13/00* (2006.01)
*G06F 13/38* (2006.01)
*G06F 3/06* (2006.01)

(52) U.S. Cl.
CPC ........... *G06F 13/385* (2013.01); *Y02B 60/1228* (2013.01); *Y02B 60/1235* (2013.01); *G06F 3/0625* (2013.01); *G06F 3/0635* (2013.01); *G06F 3/0679* (2013.01); *Y02B 60/1246* (2013.01)

(58) Field of Classification Search
None
See application file for complete search history.

(56) References Cited

U.S. PATENT DOCUMENTS

| | | | | |
|---|---|---|---|---|
| 5,229,657 | A  * | 7/1993 | Rackley | 326/26 |
| 6,380,770 | B1 * | 4/2002 | Pasqualini | 327/112 |
| 6,687,022 | B1   | 2/2004 | Lapstun et al. | |
| 8,170,167 | B1 * | 5/2012 | Roo | 375/356 |
| 8,205,047 | B2 * | 6/2012 | Kopelman | 711/154 |
| 2006/0152981 | A1 * | 7/2006 | Ryu | 365/194 |
| 2007/0018287 | A1 * | 1/2007 | Coenen | 257/666 |
| 2007/0143677 | A1 * | 6/2007 | Pyeon et al. | 715/700 |
| 2008/0224757 | A1 * | 9/2008 | Kopelman | 327/396 |
| 2009/0154256 | A1 * | 6/2009 | Kim et al. | 365/189.05 |
| 2010/0262721 | A1 * | 10/2010 | Asnaashari et al. | 710/5 |
| 2011/0179245 | A1 * | 7/2011 | Pyeon et al. | 711/168 |
| 2011/0271040 | A1 * | 11/2011 | Kamizono | 711/103 |
| 2012/0173806 | A1 * | 7/2012 | Ryu | 711/103 |

FOREIGN PATENT DOCUMENTS

KR   10-2005-0098054   10/2005

* cited by examiner

*Primary Examiner* — Sean D Rossiter
(74) *Attorney, Agent, or Firm* — Hartman Global IP Law; Gary M. Hartman; Michael D. Winter

(57) ABSTRACT

Provided is a controller for a solid state disk, to control simultaneous switching of pads. The controller for the solid state disk may control simultaneous switching of a plurality of output pads or a plurality of input pads that correspond to a plurality of channels. In particular, the controller may properly delay signals driven to the output pads or input pads, to reduce power supplied to the pads, and to prevent ground bouncing, as well as, maintain a quality of signals.

18 Claims, 5 Drawing Sheets

CONTROLLER FOR SOLID STATE DISK, WHICH CONTROLS SIMULTANEOUS SWITCHING OF PADS

CROSS-REFERENCE TO RELATED APPLICATIONS

This application is the National Stage of International Application No. PCT/KR2009/006420, filed on Nov.3, 2009, which claims the priority of Korean Patent Application No. 10-2009-0006854, filed on Jan.29, 2009. The contents of all applications are hereby incorporated by reference in their entirety.

TECHNICAL FIELD

Embodiments of the present invention relate to a controller for a solid state disk, and more particularly, to a technology that may efficiently control switching of pads when data is read from a plurality of solid state disks connected via a plurality of channels, or when data is written on a plurality of solid state disks.

BACKGROUND ART

Recently, interest in solid state disks is greatly increasing. A solid state disk uses a flash memory, a Synchronous Dynamic Random Access Memory (SDRAM) and the like, instead of a hard disk drive.

Accordingly, since a mechanical driving device such as a motor used for a hard disk drive is not required in the solid state disk, the solid state disk may be operated without almost generating heat and noise. In addition, the solid state disk may be robust to external shocks, and may achieve a high data transmission rate, compared to the hard disk drive.

A solid state disk is broadly classified into a flash-based Solid State Disk (SSD), and a Dynamic Random Access Memory (DRAM)-based SSD, and the like. The DRAM-based SSD may support quick reading and writing, and may have relatively strong durability. The flash-based SSD may have properties such as non-volatility, economical efficiency, low-power consumption, and the like.

In a solid state disk, data is written on a plurality of memories via a plurality of channels that are independent of each other, and the data is read from the plurality of memories. For example, the plurality of memories may be connected to 4 channels, 8 channels, or 16 channels that are independent of each other. Here, a plurality of channels may be driven by a plurality of output pads or a plurality of input pads. However, when the plurality of output pads or the plurality of input pads are simultaneously enabled, ground bouncing may occur, and a power required by pads may be increased. Accordingly, there is a need for a technology that may properly control signals provided to a plurality of output pads or a plurality of input pads.

DETAILED DESCRIPTION OF THE INVENTION

Technical Goals

A controller for a solid state disk according to an embodiment of the present invention may prevent a plurality of output pads or a plurality of input pads from being simultaneously switched, thereby reducing occurrence of ground bouncing, and thereby driving pads even using low power.

Additionally, a controller for a solid state disk according to an embodiment of the present invention may enable simultaneous switching of only a same number of output pads or input pads as a preset number, and may prevent pads greater than the preset number from being simultaneously switched.

Technical solutions

According to an aspect of the present invention, there is provided a controller for a solid state disk, including a control module to generate a control signal, the control signal being used to read data stored in a plurality of solid state disks, and a disk interface module to communicate with the plurality of solid state disks via a plurality of channels, and to provide read signals to a plurality of output pads in response to the control signal, the plurality of output pads corresponding to the plurality of channels, wherein the disk interface module includes a simultaneous switching prevention module to control at least one of the read signals.

According to another aspect of the present invention, there is provided a controller for a solid state disk, including a control module to generate a control signal, the control signal being used to write data on a plurality of solid state disks, and a disk interface module to communicate with the plurality of solid state disks via a plurality of channels, and to provide write signals to a plurality of output pads in response to the control signal, the plurality of output pads corresponding to the plurality of channels, wherein the disk interface module includes a simultaneous switching prevention module to control at least one of the write signals.

According to still another aspect of the present invention, there is provided a controller for a solid state disk, including a control module to read data stored in a plurality of solid state disks, and to generate a control signal, the control signal being used to write the data on the plurality of solid state disks, and a disk interface module to provide output control signals to a plurality of output pads in response to the control signal, and to receive input control signals via a plurality of input pads, the plurality of output pads corresponding to a plurality of channels, and the input control signals being associated with the data stored in the plurality of solid state disks, wherein the disk interface module includes a simultaneous switching prevention module to control the output control signals or the input control signals.

Effect of the Invention

According to embodiments of the present invention, a controller for a solid state disk may prevent a plurality of output pads or a plurality of input pads from being simultaneously switched, thereby reducing occurrence of ground bouncing, and thereby driving pads even using low power.

Additionally, according to embodiments of the present invention, a controller for a solid state disk may enable simultaneous switching of only a same number of output pads or input pads as a preset number, and may prevent pads greater than the preset number from being simultaneously switched.

BEST MODE FOR CARRYING OUT THE INVENTION

Hereinafter, exemplary embodiments of the present invention will be described in detail with reference to the accompanying drawings.

Figure 1:
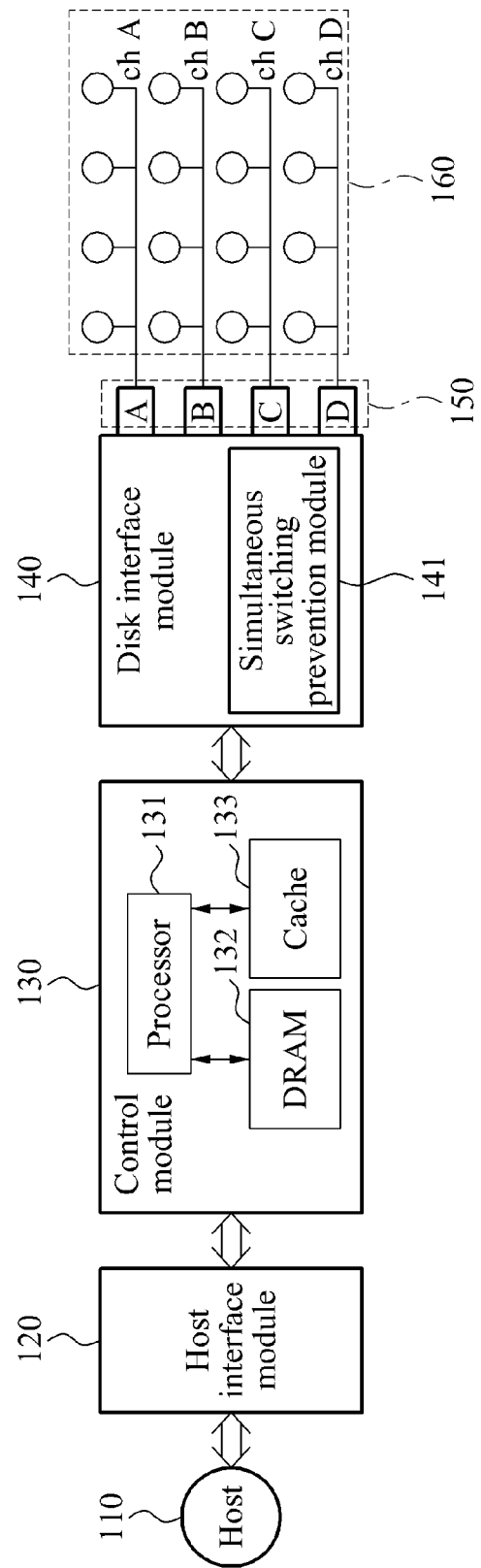
FIG. 1 is a diagram illustrating a storage system using a solid state disk according to an embodiment of the present invention.

FIG. 1 is a diagram illustrating a storage system using a solid state disk according to an embodiment of the present invention.

Referring to FIG. 1, a controller for a plurality of solid state disks 160 includes a host interface module 120, a control module 130, and a disk interface module 140.

The host interface module 120 may receive, from a host 110, requests to write data on the plurality of solid state disks 160 or to read data stored in the plurality of solid state disks 160. Additionally, the host interface module 120 may provide the requests to the control module 130. Here, the host interface module 120 may support various standards, such as Peripheral Component Interconnect (PCI), PCI-X, PCI-Express, HyperTransport, Universal Serial Bus (USB), or the like.

Additionally, the control module 130 may interpret the requests, and may generate, based on an interpreted result, a control signal used by the host 100 to read desired data from the solid state disks 160, or a control signal used to write the data on the solid state disks 130.

In particular, the control module 130 includes a processor 131, a Dynamic Random Access Memory (DRAM) 132 for the processor 131, and a cache 133. Here, the processor 131 may drive a Flash Translation Layer (FTL) for wear-leveling, and the cache 133 may support rapid access.

Additionally, the disk interface module 140 may provide output control signals to a plurality of output pads corresponding to a plurality of channels, in response to the control signal, and may receive, via a plurality of input pads, input control signals associated to the data stored in the plurality of solid state disks 160. Here, pads driven by control signals transferred in a direction from the controller to the solid state disks 160 are referred to as 'output pads,' and pads driven by control signals transferred in the opposite direction are referred to as 'input pads.'

Here, the plurality of solid state disks 160 are connected to a plurality of channels (channels A, B, C, and D) that are independent of each other. In other words, data may be independently written on the plurality of solid state disks 160, and the data stored in the plurality of solid state disks 160 may be read in parallel. Here, the plurality of solid state disks 160 may be NAND flash memories, NOR flash memories, or one of non-volatile memories.

A plurality of pads A, B, C, and D may be driven by control signals (input control signals or output control signals). For example, when the control module 130 generates a control signal used to write data, at least one of a plurality of output pads A, B, C, and D may be driven by an output control signal corresponding to the at least one output pad. Similarly, when the control module 130 generates a control signal used to read data, at least one of the pads A, B, C, and D may be driven by an output control signal corresponding to the at least one pad. Additionally, the plurality of pads A, B, C, and D may be driven by input control signals provided from the solid state disks 160.

However, input pads or output pads are simultaneously switched by input control signals or output control signals, various problems may occur. For example, ground bouncing may occur, and power consumption may be increased by increasing a rising delay or a falling delay. Accordingly, there is a need for a technology that may control simultaneous switching of input pads or output pads.

Here, the disk interface module 140 according to an embodiment of the present invention may include a simultaneous switching prevention module 141 to prevent input pads or output pads from being simultaneously switched, by controlling output control signals or input control signals. The simultaneous switching prevention module 141 may be implemented in a hardware manner.

In particular, the simultaneous switching prevention module 141 may properly delay output control signals or input control signals, to prevent simultaneous switching of the pads. Additionally, the simultaneous switching prevention module 141 may control output control signals or input control signals, so that a number of simultaneously switched pads among a plurality of output pads and a plurality of input pads may be equal to or less than a preset number.

Here, a maximum number of simultaneously switched pads among four pads A, B, C, and D is assumed to be limited to '2.' Here, when the four pads are simultaneously enabled, the simultaneous switching prevention module 141 may properly delay control signals applied to two pads. For example, the simultaneous switching prevention module 141 may properly delay the control signals applied to the two pads, so that the two pads may be enabled in the next clock.

Figure 2:
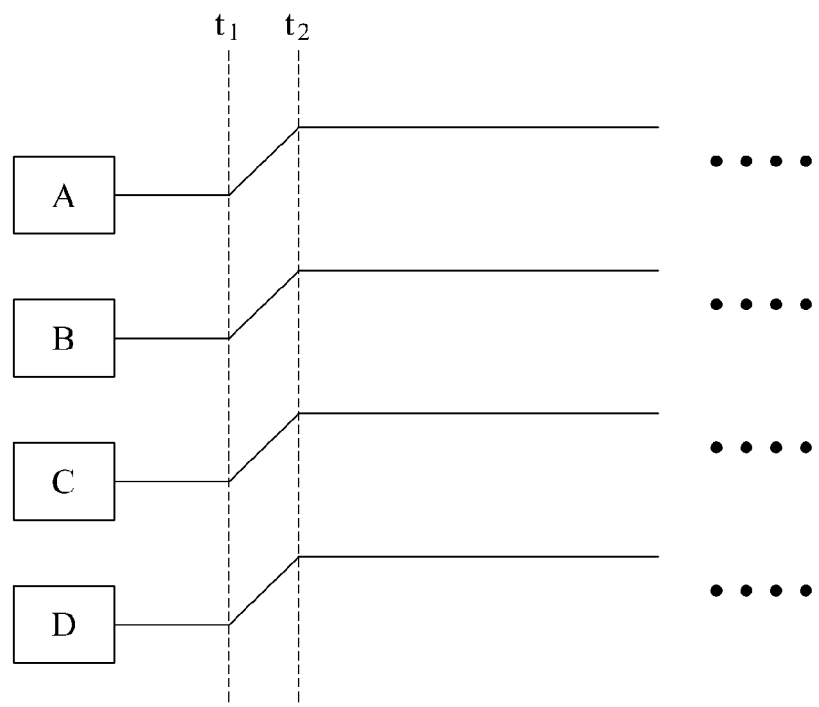
FIG. 2 is a diagram illustrating an example in which output pads or input pads are simultaneously switched.

FIG. 2 is a diagram illustrating an example in which output pads or input pads are simultaneously switched.

Referring to FIG. 2, it may be found that output control signals or input control signals applied to output pads or input pads A, B, C, and D are simultaneously switched. In other words, it may be found that all of the output control signals or input control signals rise from t1 to t2.

As shown in FIG. 2, when all the output pads or input pads A, B, C, and D are simultaneously switched, ground bouncing may occur, and a required power may be increased. Accordingly, the present invention may control output control signals or input control signals so that all the output pads or input pads A, B, C, and D may be switched in different times, or that only a same number of pads as a preset number may be simultaneously switched.

Figure 3:
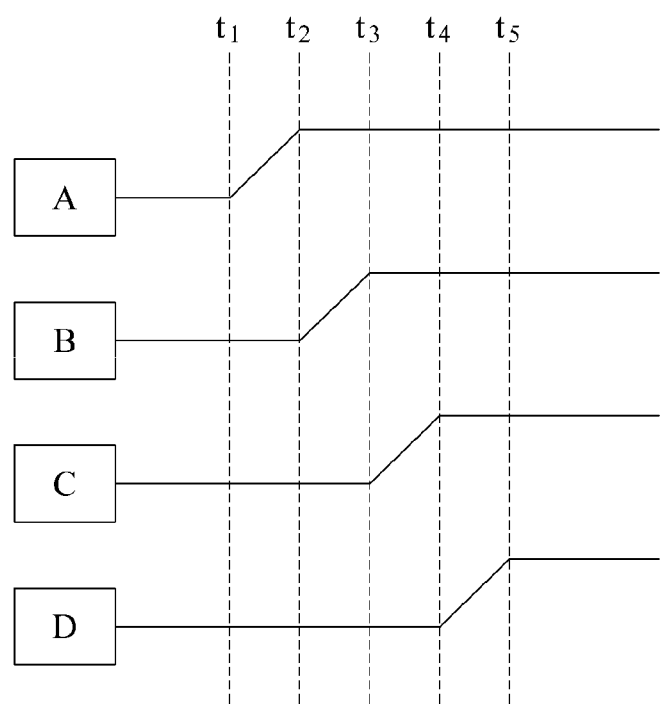
FIG. 3 is a diagram illustrating an example of controlling all output pads or input pads not to be simultaneously switched.

FIG. 3 is a diagram illustrating an example of controlling all output pads or input pads not to be simultaneously switched.

When the input control signals or output control signals shown in FIG. 2 are provided to input pads or output pads, a simultaneous switching prevention module according to an embodiment of the present invention may properly control the input control signals or output control signals so that all of the input pads or output pads may not be simultaneously switched. Hereinafter, both an input control signal and an output control signal will be called a control signal.

Referring to FIG. 3, a control signal applied to a pad B may be delayed by 't2-t1' based on a control signal applied to a pad A. Additionally, a control signal applied to a pad C may be delayed by 't3-t1,' and a control signal applied to a pad D may be delayed by 't4-t1.' Accordingly, it may be found that all pads are not be simultaneously switched.

The simultaneous switching prevention module of the present invention may control control signals so that a number of simultaneously switched pads may be equal to or less than a preset number. For example, the simultaneous switching prevention module may properly control signals so that a number of pads simultaneously switched among four pads may be '3', or may be equal to or less than 2.

Figure 4:
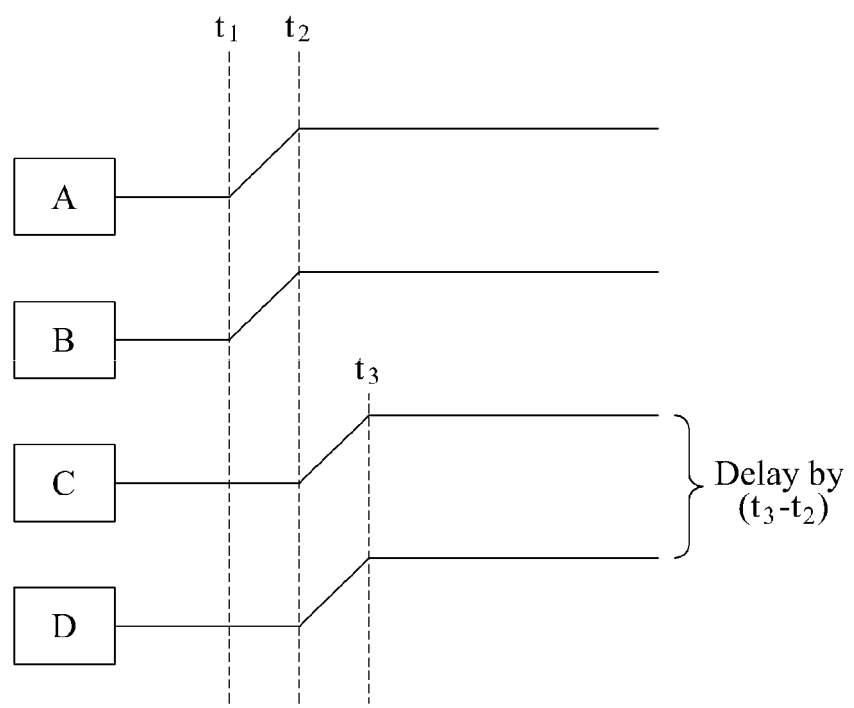
FIG. 4 is a diagram illustrating an example of controlling a number of pads simultaneously switched to be equal to or less than a preset number.

FIG. 4 is a diagram illustrating an example of controlling a number of pads simultaneously switched to be equal to or less than a preset number.

Referring to FIG. 4, when the number of simultaneously switched pads is limited to be equal to or less than '2,' a simultaneous switching prevention module according to an embodiment of the present invention may delay control signals corresponding to pads C and D, without a change in control signals corresponding to pads A and B. Accordingly, the control signal corresponding to the pad C may be delayed by t2-t1, and the control signal corresponding to the pad D may be delayed by t3-1.

Here, the limitation to the number of simultaneously switched pads may be variously set.

Figure 5:
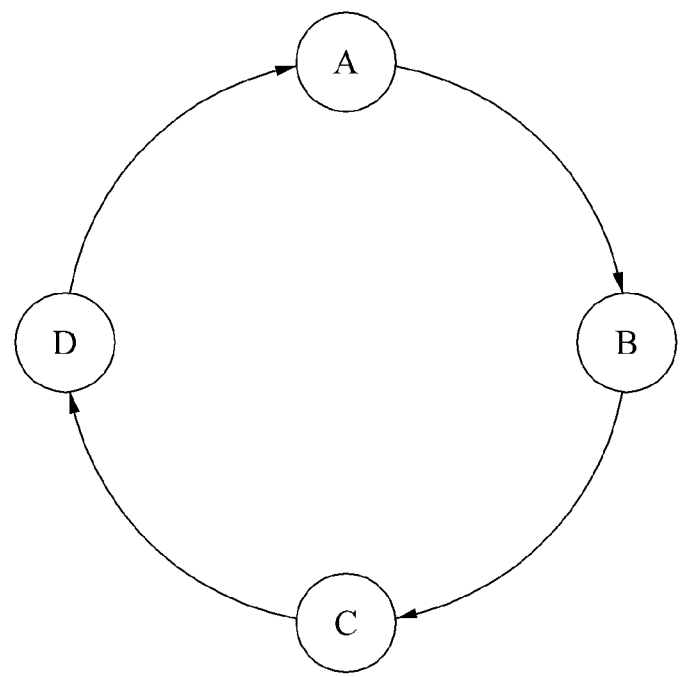
FIG. 5 is a diagram illustrating an example of determining whether pads are switched, based on a ring scheme.

FIG. 5 is a diagram illustrating an example of determining whether pads are switched, based on a ring scheme.

Referring to FIG. 5, a simultaneous switching prevention module of the present invention may sequentially determine whether pads are enabled or disenabled.

In an example, it is assumed that a number of simultaneously switched pads is limited to 2, and that all of the pads are simultaneously enabled. Here, the simultaneous switching prevention module may determine, in an order of pads A, B, C, and D, whether the pads are enabled. When the pads A and B are enabled, the simultaneous switching prevention module may determine whether the pad C is enabled. Since the pad C is also enabled, a control signal corresponding to the pad C may be delayed. Since the pad D is also enabled, a control signal corresponding to the pad D may also be delayed.

In another example, it is assumed that the number of simultaneously switched pads is limited to 1, and that all of the pads are simultaneously enabled. Here, the simultaneous switching prevention module may delay, by b, a control signal corresponding to the pad B, and may delay, by c, a control signal corresponding to the pad C. Additionally, a control signal corresponding to the pad D may also be delayed by d. Here, b, c, and d may have different values.

While an example in which a number of channels is 4 has been described above, it is obvious that the present invention is applicable to various examples in which the number of channels is 2, 4, 8, 16, and the like.

Additionally, an operating method of a controller for a solid state disk according to embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A controller for a solid state disk, the controller comprising:
   a control module to generate a control signal, the control signal being used to read data stored in a plurality of solid state disks; and
   a disk interface module to communicate with the plurality of solid state disks via a plurality of channels, and to provide read signals to a plurality of output pads in response to the control signal, each of the plurality of output pads being individually dedicated to one of to the plurality of channels,
   wherein the disk interface module comprises a simultaneous switching prevention module to control the timing of at least one of the read signals provided to at least one of the plurality of output pads and thereby limit the number of output pads that are simultaneously switched in logic levels.

2. The controller of claim 1, wherein the simultaneous switching prevention module controls at least one of the read signals, so that a number of output pads simultaneously switched among the plurality of output pads is equal to or less than a preset number.

3. The controller of claim 2, wherein the simultaneous switching prevention module sequentially determines whether the plurality of output pads are simultaneously switched, and controls the number of output pads simultaneously switched among the plurality of output pads.

4. The controller of claim 1, wherein the simultaneous switching prevention module delays at least one of the read signals.

5. The controller of claim 1, further comprising:
   a host interface module to communicate with a host, the host desiring to read the data stored in the plurality of solid state disks.

6. The controller of claim 1, wherein the read signals provided to the plurality of output pads corresponding to the plurality of channels are independent of each other.

7. The controller of claim 1, wherein the plurality of solid state disks are on a non-volatile memory device.

8. A controller for a solid state disk, the controller comprising:
   a control module to generate a control signal, the control signal being used to write data on a plurality of solid state disks; and
   a disk interface module to communicate with the plurality of solid state disks via a plurality of channels, and to provide write signals to a plurality of output pads in response to the control signal, each of the plurality of output pads being individually dedicated to one of the plurality of channels,
   wherein the disk interface module comprises a simultaneous switching prevention module to control the timing of at least one of the write signals provided to at least one of the plurality of output pads and thereby limit the number of output pads that are simultaneously switched in logic levels.

9. The controller of claim 8, wherein the simultaneous switching prevention module controls at least one of the write signals, so that a number of output pads simultaneously switched among the plurality of output pads is equal to or less than a preset number.

10. A controller for a solid state disk, the controller comprising:
   a plurality of solid state disks to store data; and
   a disk interface module to receive input control signals via a plurality of channels, the input control signals being associated with the data stored in the plurality of solid state disks,
   wherein the disk interface module comprises a simultaneous switching prevention module to adjust the timing of at least one input control signal among the input control signals, and to provide the at least one input control signal to a plurality of input pads corresponding to the plurality of channels thereby limit the number of input pads that are simultaneously switched in logic levels, each of the plurality of input pads being individually dedicated to one of the plurality of channels.

11. A controller for a solid state disk, the controller comprising:
   a control module to read data stored in a plurality of solid state disks, and to generate a control signal, the control signal being used to write the data on the plurality of solid state disks; and
   a disk interface module to provide output control signals to a plurality of output pads in response to the control signal, and to receive input control signals via a plurality of input pads, each of the plurality of output pads being individually dedicated to one of a plurality of channels, and the input control signals being associated with the data stored in the plurality of solid state disks,
   wherein the disk interface module comprises a simultaneous switching prevention module to control the timing of the output control signals or the input control signals provided to at least one of the plurality of output pads and input pads, respectively, and thereby limit the number of output pads or input pads that are simultaneously switched in logic levels.

12. The controller of claim 11, wherein the simultaneous switching prevention module controls the output control signals or the input control signals, so that a number of pads simultaneously switched among the plurality of output pads and the plurality of input pads is equal to or less than a preset number.

13. The controller of claim 11, wherein the simultaneous switching prevention module controls the output control signals or the input control signals, so that a clock is changed where at least one pad among the plurality of output pads and the plurality of input pads is switched.

14. The controller of claim 12, wherein the simultaneous switching prevention module sequentially determines whether the plurality of output pads or input pads are simultaneously switched, and controls the number of output pads or input pads simultaneously switched among the plurality of output pads or input pads.

15. The controller of claim 11, wherein the simultaneous switching prevention module delays at least one of the output control signals or the input control signals.

16. The controller of claim 11, further comprising:
   a host interface module to communicate with a host, the host desiring to read the data stored in the plurality of solid state disks or write data to the plurality of solid state disks.

17. The controller of claim 11, wherein the read signals provided to the plurality of output pads corresponding to the plurality of channels are independent of each other.

18. The controller of claim 11, wherein the plurality of solid state disks are on a non-volatile memory device.

* * * * *